United States Patent [19]

Botcherby et al.

[11] 4,123,145
[45] Oct. 31, 1978

[54] OPTICAL PATH LENGTH MODULATOR

[75] Inventors: Stephen C. L. Botcherby, Dorking; Christopher P. Starbuck, London, both of England

[73] Assignee: Decca Limited, London, England

[21] Appl. No.: 608,198

[22] Filed: Aug. 26, 1975

[30] Foreign Application Priority Data

Sep. 3, 1974 [GB] United Kingdom ............... 38502/74

[51] Int. Cl.² ........................................... G05D 25/00
[52] U.S. Cl. ..................................... 350/269; 350/603; 350/606
[58] Field of Search ...................... 350/6, 99, 266, 269; 331/94.5 C, 94.5 M; 356/106; 73/657, 655

[56] References Cited
U.S. PATENT DOCUMENTS

| | | | |
|---|---|---|---|
| 3,286,582 | 11/1966 | Mertz | 356/106 |
| 3,529,894 | 9/1970 | Hock | 356/113 |

Primary Examiner—S. C. Buczinski
Attorney, Agent, or Firm—Cushman, Darby & Cushman

[57] ABSTRACT

An optical path-length modulator which comprises a tube having at one open end a lens of which the focal length is equal to the distance between this lens and the surface of a concave mirror which is disposed at the closed end of the tube and which has a radius of curvature equal to the focal length of the lens. The tube is carried between and mounted on two spaced apart diaphragms which can flex in order that the tube may move axially. The tube constitutes an armature for an electromagnetic vibrator which includes also pole pieces surrounding the tube and a driving coil on one of the pole pieces. Energization of the driving coil causes to and fro axial movement of the tube. Collimated light entering the tube via the lens is brought to a focus at the surface of the mirror and is rereflected the way it entered.

9 Claims, 3 Drawing Figures

OPTICAL PATH LENGTH MODULATOR

BACKGROUND OF THE INVENTION

This invention relates to optical path-length modulators.

One particularly suitable although not exclusive field of use for which this invention is intended is in a vibration de ector of the kind in which a coherent beam of light from, for example a laser, is directed onto an element the vibration of which is to be detected. In such a detector, light which is directed at the object is mixed with light not so reflected in order to derive a Doppler signal denoting the movement of the object. As is further explained in the specification of that patent, it is necessary, in order to distinguish between movement towards and away from the source of light to introduce phase modulation into either the light which is reflected from the object or the reference light which is not so reflected. One way of achieving this modulation is to modulate the path length of the light which is to be subjected to phase modulation. The introduction of modulation of the path length is not a straightforward matter because it is desirable to avoid any undue loss of light and it is also desirable to be able to introduce modulation without affecting any arrangements for focussing the beam of light which is to be projected at the target.

SUMMARY OF THE INVENTION

One object of the invention is to provide an improved optical path length modulator.

A further object of the invention is to provide an optical path length modulator which can receive collimated light and reflect the same back along the path whence it came with a minimum loss of light whilst altering the length of the path that the light traverses.

In a preferred form of the invention, the modulator comprises a support, which may be in the form of a tube that is open at one end. The support is mounted on and between two spaced apart substantially parallel diaphragms which can flex to permit to and fro movement of the support along an axis normal to the diaphragms. Preferably the open end of the tube is mounted on one of the diaphragms. The support carries, preferably at the open end, a converging lens which can receive light from outside the support. A concave mirror is disposed within the tube at the focus of the lens and has a radius of curvature equal to the focal length of the lens. Thus collimated light entering the diverging lens can be reflected exactly back along the path of incidence. The tube is surrounded by a tubular pole piece which carries a driving coil. Thus the tube, the pole piece and the coil may act as an electromagnetic vibrator whereby the tube and the lens and the mirror are all vibrated as one to and fro along the axis of the tube.

Other objects and features of the invention will be apparent from the following description of a preferred embodiment.

DETAILED DESCRIPTION OF THE PREFERRED EMBODIMENT

Figure 1:
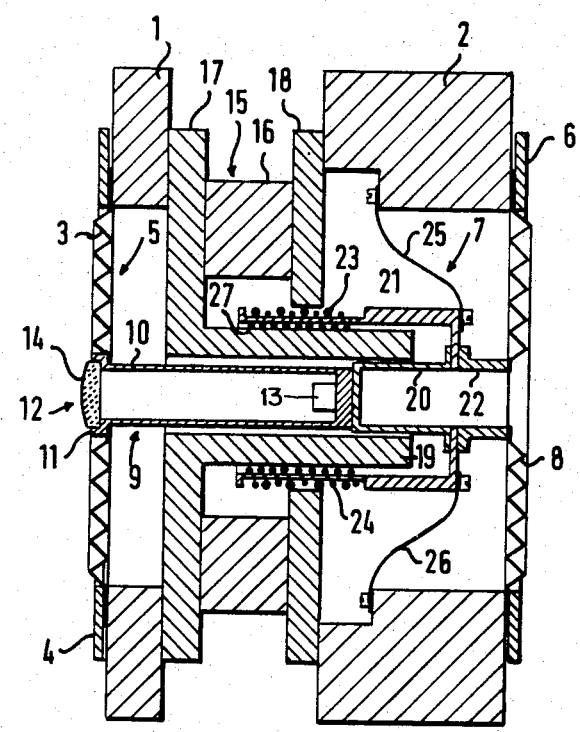
FIG. 1 is a diagrammatic longitudinal section of an optical path length modulator in accordance with the invention.
Figure 2:
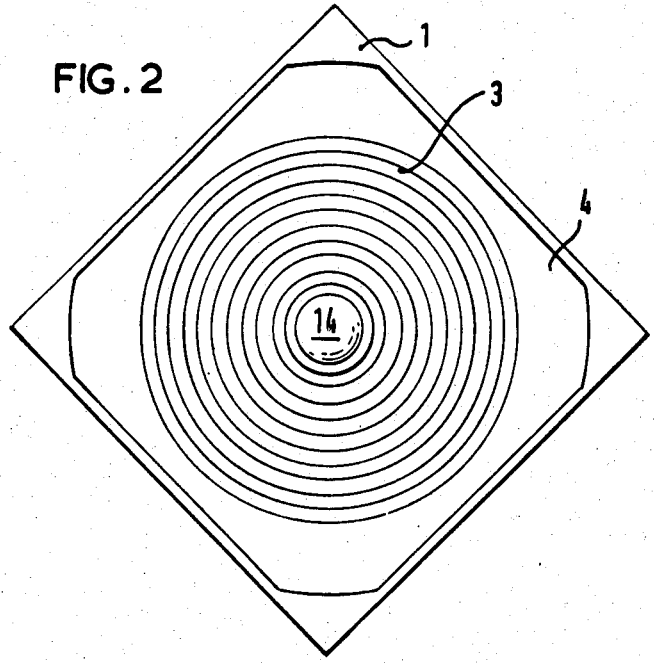
FIG. 2 is a front view of the modulator of FIG. 1.

The modulator which is shown in FIG. 1 includes two spaced apart formers 1 and 2. Each former is square in external section but is circular in internal section. The front former 1 is coaxial with the rear former 2 but of lesser thickness. A circular diaphragm 3 is secured on the front face of the front former 1 by means of a retaining ring 4 encircling an aperture 5 in the front former. The rear former 2 bears a similar retaining ring 6 encircling the aperture 7 provided by the inside surface of the rear former and the retaining ring 6 holds between itself and the rear of the former 2 a circular diaphragm 8. The diaphragms may be constituted by a suitable fabric and may be formed in a manner similar to a bellows.

A support 9 is carried by and disposed between the spaced apart diaphrams 3 and 8. The diaphragms are disposed to allow axial movement of the support 9 in a direction normal to the diaphragms. The support 9 includes a magnetic tube 10 of which one end is secured at the centre of the bellows 3 and carries in a retaining lip 11 a converging lens 12. The axis of the lens is coaxial with the axis of the tube 10 and the axis of to and fro movement of the support 9. At the other end of the tube 10 and approximately midway along the support 9 is a concave mirror 13. The mirror is aligned with the axis of the lens 12 and is positioned such that the focal point of the lens coincides with the surface of the concave mirror. The radius of curvature of the mirror is equal to the focal length of the lens. Accordingly, a collimated light beam which is travelling along the conjoint axis of the lens and the mirror and which strikes the outside surface 14 of the lens is brought to a focus at the surface of the mirror 13 and thereupon reflected back exactly whence it came. The path length of the light can be altered without prejudice to its direction and without wastage of light by movement of the system of the lens and the mirror axially.

An electromagnetic vibrator is provided for producing axial movement of the optical system constituted by the lens 12 and the mirror 13. The support 9 constitutes the armature of the electromagnetic vibrator. Disposed around the support 9 is a magnet 15 which has a main annular body 16 with spaced apart annular pole-pieces 17 and 18. The pole-piece 17 is disposed adjacent the front former 1 and extends inwardly to surround closely a portion of the tube 10 that forms part of the support 9. The other pole-piece 18 is disposed adjacent an inner end face of the former 2 and extends towards the tube 9 to a lesser extent than does the pole-piece 17. From the inner periphery of the pole-piece 17 extends a tubular pole-piece 19 coaxially with and surrounding the central part of the support 9. The pole-piece 19 embraces a substantial portion of the tube 10 and passes inside the inner periphery of the pole-piece 18 so as to form an annular air gap therewith.

At the inner end of the tube 10 is secured a nylon former 20 which is secured to an inner end flange of a cylindrical former 21. Extending from the end flange of the former 22 is a flanged bushing 22 which is secured at the centre of the diaphragm 8. The former 21 extends throught the air gap between the pole-piece 19 and is movable coaxially relative thereto. The former 21 forms part of the support 9 and accordingly movement of the former 21 will move the support 9 and the optical system already described. The former 21 carries a coil 23 which constitutes a driving coil which extends axially along the support 9 and through the air gap between the pole-pieces 18 and 19. Energisation of the coil causes movement of the support 9 and the optical system axially. Normally the coil will be energised with a time varying signal at an appropriate frequency. The former itself carries a sensing coil 24 which is coaxial with the coil 23. Leads of which only two (25 and 26) are shown are provided between the former 2 and the former 21 in order to convey electric current to and from the coils 23 and 24.

On the outer surface of the pole-piece 19 and extending through the air gap between the pole-piece 18 and the pole-piece 19 is a further coil 27.

The coils 24 and 27 are not essential to the operation of the device in its basic form which can be made to operate by appropriate energisation of the coil 23. However, FIG. 3 illustrates one form of control circuit which is preferred because it provides compensation for debilitation of the driving signal by virtue of induced electro-motive force in the coils carried by the former 21.

Figure 3:
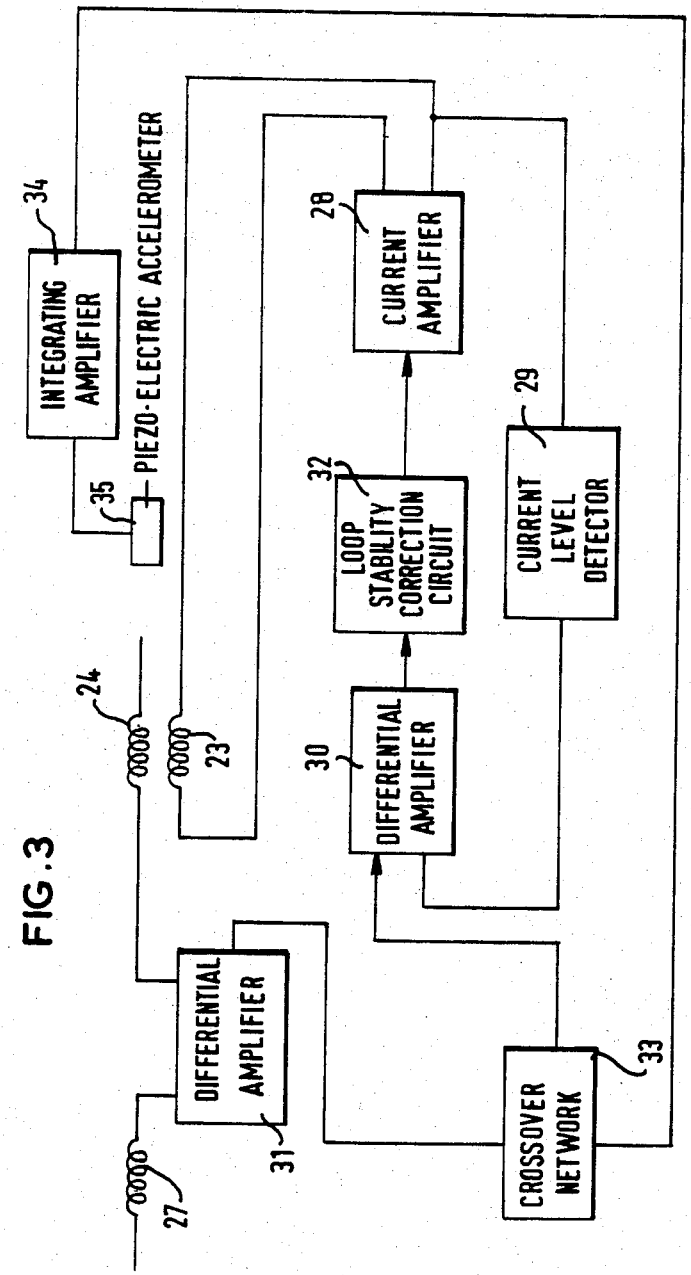
FIG. 3 is a diagram illustrating one possible form of control circuit for energising the modulator of FIG. 1.

In FIG. 3, the coil 23, the main driving coil, the coil 24, the movable coil carried on the former 21 and the fixed coil 27 carried on the pole-piece 19 are illustrated again. The coil 23 is energised by means of a current amplifier 28. The output level of this amplifier is detected by a detector which produces one of two outputs, either a high level direct current output or a low level direct current output according to the level of current provided by the amplifier 28. The output of the detector 29 is fed to one input of a differential amplifier 30. This amplifier receives an output from a cross-over network 33 which, at frequencies below 15H2 feeds to the amplifier 30 the output of the differential amplifier 31 of which the inputs are signals obtained from the coils 24 and 27. The output of the amplifier 30 is fed through a typical loop-stability correction circuit 32, normally consisting of various time delays in accordance with the usual practice in constructing electroservo mechanisms, and is fed to the current amplifier 28. For frequencies about 30Hz, the cross-over network feeds to the differential amplifier 30 the output of an integrating amplifier 34 which is fed by a piezo-electric accelerometer 35. This accelerometer would be mounted on the former 21 or other suitable part of the movable support 9.

We claim

1. An optical path length modulator comprising; two spaced apart substantially parallel flexible supporting members;
   a support which is mounted on and between said flexible supporting members for movement to and fro along an axis, a converging lens and a concave mirror, the lens and the mirror being carried by the support, the lens having a focal length equal to the distance between the lens and the surface of the mirror and the mirror having a radius of curvature equal to the focal length of the lens; and means for vibrating the support to and fro along said axis.

2. A modulator according to claim 1, in which the said support comprises a tube having an open end shaped for holding said converging lens and a closed end in which the concave mirror is disposed, the tube being supported at its open end on one of the supporting members.

3. A modulator according to claim 2 in which the said means for vibrating comprises a magnetic pole piece which is positioned between the flexible supporting members, and a driving coil disposed on the pole piece, said support constituting an armature for said vibrator.

4. A modulator according to claim 1 in which the vibrator includes two annular pole pieces which each surround the said support at spaced apart locations and which form parts of an electromagnet, one of the said pole pieces extending axially of the support between the support and the other pole piece, a driving coil disposed on the axially extending pole piece, a former carried by the support extending axially thereof between the two pole pieces and carrying a sensing coil, said support constituting an armature for said vibrator.

5. A modulator according to claim 4, further comprising a second sensing coil carried on the said axially extending pole piece.

6. A modulator according to claim 5, further comprising means for sensing signals induced in the sensing coils, means for forming a correction signal in accordance with the difference between said induced signals, means for generating a driving signal for the driving coil and means for adding the correction signal to the driving signal.

7. A modulator according to claim 1 in which each flexible supporting member comprises a diaphragm.

8. A modulator according to claim 2 in which each flexible supporting member comprises a diaphragm.

9. A modulator according to claim 4 in which each flexible supporting member comprises a diaphragm.

* * * * *